Aug. 23, 1966  S. J. CIRCLE ETAL  3,268,335
SOY PROTEIN AND SOY LECITHIN COMPOSITION
Filed Jan. 16, 1962
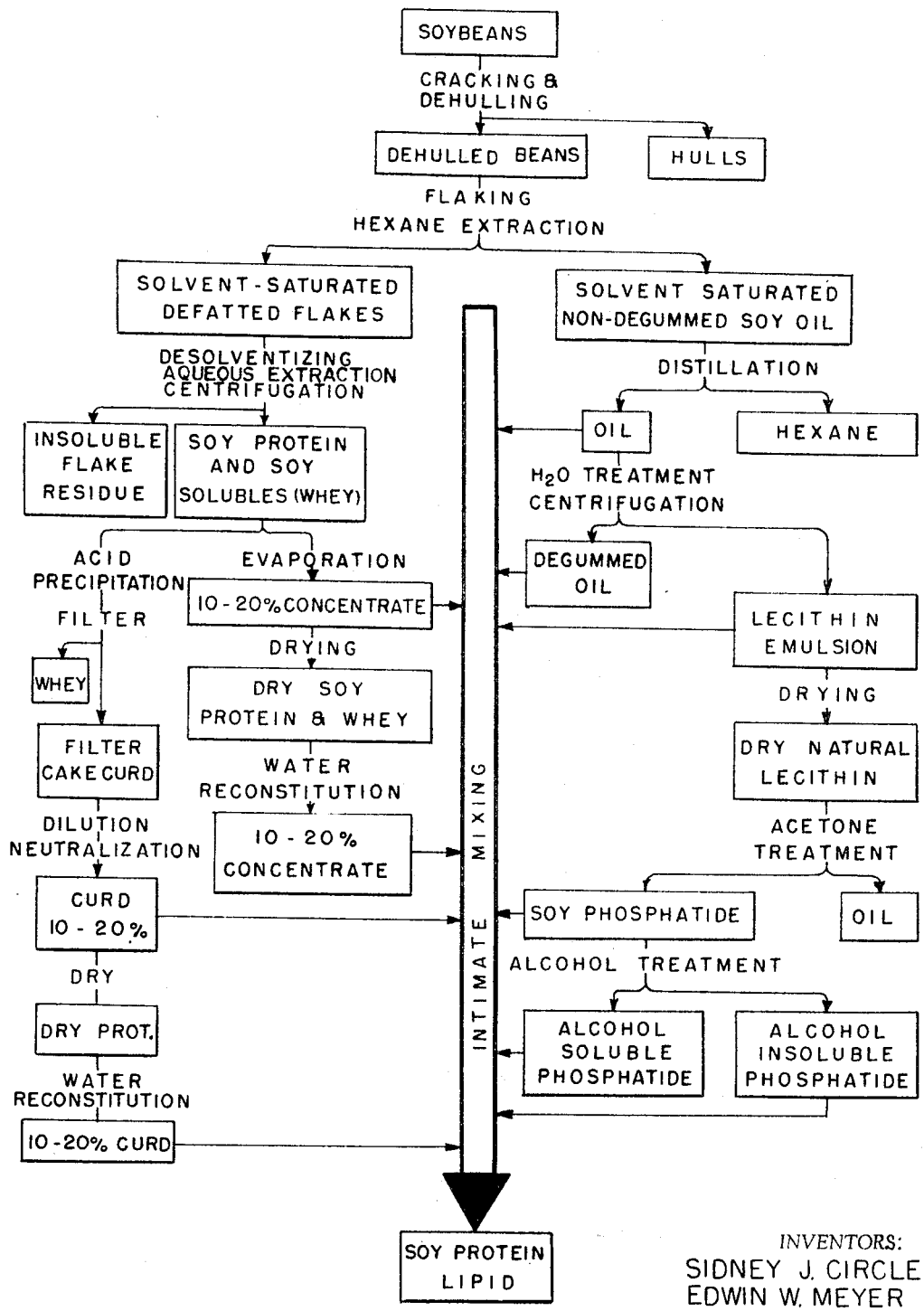
INVENTORS:
SIDNEY J. CIRCLE
EDWIN W. MEYER 3,268,335
SOY PROTEIN AND SOY LECITHIN COMPOSITION
Sidney J. Circle and Edwin W. Meyer, Chicago, Ill., assignors to Central Soya Company, Inc., Fort Wayne, Ind., a corporation of Indiana
Filed Jan. 16, 1962, Ser. No. 166,657
2 Claims. (Cl. 99—15)

This invention relates to a protein-lipid composition and to the production and use thereof. The composition has particular utility as an emulsifier for food.

It is an object of this invention to provide a novel composition of matter in which a soy protein is intimately admixed with a lipid. Comprehended within this general objective is methodology involving the preparation of the intimate admixture and usage thereof, a particularly advantageous use being an emulsifying agent for food.

Another object of the invention is to provide a composition of the character described in the object immediately above which is characterized by advantageous uniformity and free flowability when in powder form, the composition additionally being generally stable, i.e., free of the oxidative rancidity normally occasioned by prolonged storage. The product is further characterized as non-greasy, and is effective to provide a nutritious, conveniently handled emulsifier for such foods as bread, noodles, macaroni, ice cream, salad dressing, confectionery, cookies, biscuits, crackers, prepared mixes, and simulated dairy products.

Still another object of the invention is to provide a composition consisting essentially of a soy protein and a lipid such as a phospholipid, particularly lecithin, which is particularly useful as an emulsifying agent in foods normally employing egg yolk.

Yet another object is to provide a composition and use thereof, particularly as an emulsifier, to be used in place of or in conjunction with egg yolk, and which permits an advantageous adjustment in the proportions of the protein and lipid portions to meet a variety of food preparation conditions heretofore not satisfactorily realized when egg yolk itself has been employed.

Other objects and advantages of the invention may be seen in the details of specific embodiments of the invention set down hereinafter.

The invention will be described in conjunction with the accompanying drawing which is a diagram of soybean processing which illustrates certain advantageous ways of practicing the invention.

In one embodiment of the invention, soy protein is brought into intimate admixture with a lipid and thereafter the mixture dried to provide a free-flowing powder characterized by extended shelf life.

The soy protein may take a variety of forms, and to aid the skilled artworker in appreciating this, reference is now made to the drawing, which is a diagram of soybean processing. The drawing also illustrates a variety of soy lipid materials which can be utilized in the practice of the invention.

At the extreme top of the drawing, the starting material is seen to be soybeans, which are conventionally provided in clean form. The soybeans are subjected to cracking and dehulling to provide as the products thereof the dehulled beans and the hulls. As can be seen from the diagram of the drawing, the products resulting from the processing steps are set down in boxes or enclosures, thereby distinguishing the products from the procedural steps.

The dehulled beans which are utilized further to provide the protein and lipid portions, are then subjected to a flaking operation and thereafter to solvent extraction. Conventionally, this is done using hexane as the solvent, and thus the diagram specifies hexane as the extracting solvent.

The extraction operation results in solvent-saturated defatted flakes and solvent-saturated, non-degummed soy oil. The double negative prefix is conventional parlance in this art to designate that the oil still contains the gum fraction.

Referring now to the left-hand side of the drawing, it will be seen that the defatted flakes are desolventized and extracted—the extraction usually employing a mild alkali or hot water. The desolventizing removes any occluded hexane and may be achieved through vacuum distillation, steam, etc. Following extraction, the flakes are subjected to centrifugation or screening to provide an insoluble flake residue (fiber) and as the other product the soy protein and "whey" (i.e., the soy protein-solubles). Normally the product contains less than about 1% crude fiber, but under certain conditions may be greater.

At this stage, the mixture of protein and "whey" may be subjected to an evaporation step to reduce the water content so as to concentrate the solids to the order of 10–20%. The substantially fiber-free solids in this form may be used directly in the practice of the invention by intimate mixing with lipid, as indicated by the central large downwardly-extending arrow in the drawing, resulting in a soy protein lipid product.

Alternatively, the 10–20% solids concentration may be subjected to a drying operation to provide dry soy protein and "whey." This product may be stored for use at a more convenient time later, when it may be reconstituted with water to the previous concentration and then used as a reactant.

Still referring to the left-hand side of the drawing, it will be seen that soy protein and "whey" may be subjected to an acid precipitation step, this conventionally employing hydrochloric acid to provide a thin curd having a pH of the order of 4.5. The precipitate is then subjected to a filtering step to separate the soluble whey from the curd, which is in the form of a filter cake having 25–35% solids, the remainder being water. The filter cake curd is thereafter diluted with water to achieve a dispersion having 10–20% solids and neutralized with a suitable food grade alkali such as sodium hydroxide, potassium hydroxide, ammonium hydroxide, etc., to provide the curd dispersion indicated as useful as a mixing reactant.

Alternatively, the 10–20% curd may be dried as such or in the neutralized form, by spray-drying and stored as dry protein or proteinate, respectively, for later use. When used in this form, the dry protein is reconstituted with water, as seen at the extreme left-hand bottom portion of the drawing, and then used in the mixing step.

Referring now to the right-hand side of the drawing, the solvent-saturated, non-degummed soy oil is subjected to a distillation step to separate the hexane from the oil. The oil is then subjected to a water treatment either in the form of water or steam, or both, and centrifuged to provide de-gummed oil and a lecithin emulsion. In certain operations, the degummed oil, essentially a triglyceride, may be advantageously mixed with the soy protein. Preferably, however, the lecithin emulsion is employed, either as such, or in modified form as the lipid reactant. When a modified form of lecithin is desired as the mixing reactant, the lecithin emulsion is dried to provide so-called "dry natural lecithin." The dry natural lecithin has about two-thirds phosphatides and one-third oil, which may be separated by the indicated acetone treatment. The previously-referred-to lecithin emulsion, for example, may be about 50% water, 33% phosphatides, and 17% oil. In the instance when dry lecithin is employed, we prefer to reconstitute with water to provide the mixing reactant.

Following the acetone treatment, the separated soy phosphatides may be used as such as the lipid reactant in the mixing step, or the so-called "100% phosphatides" may be subjected to an alcohol treatment to separate the phosphatides into the alcohol-soluble phosphatides portion and the alcohol-insoluble phosphatides portion. Depending upon the concentration and treating conditions, the proportions of the soluble and insoluble fractions may be varied as desired. In any event, either fraction can be advantageously combined (preferably as an emulsion) with soy protein to provide a soy protein-lipid useful as an emulsifier for food preparation.

From the foregoing, it will be seen that the soy protein is provided at about a neutral pH through the neutralization step. The soy protein in the curd form is at the isoelectric point where the pH is about 4.5. In some operations, the soy protein may be combined with lipid without previous neutralization, or with neutralization to the extent that the pH of the resultant proteinate is of the order of 9. However, we prefer that the soy proteinate be in the pH range of 6–8.

From the variety of lipids indicated as useful in the practice of the invention, it will be appreciated that lipids other than those emanating from soybeans may be advantageously employed, such as those emanating from other vegetable sources such as corn, cottonseed, peanuts, etc.

The commercial lecithin which is preferred is a combination of various phospholipids, the main components being lecithin itself, which is known as a phosphatidyl choline; cephalin, known as phosphatidyl ethanolamine; inositol-type phosphatides; and phosphatidyl serine. These four principal ingredients are present in varying proportions, with the remainder being soybean oil.

It is believed that the invention will be better understood by a consideration of specific examples, and for that purpose the following are set down:

*Example I*

15 kg. of soy protein curd at 30% solids were mixed with 30 kg. of water to give a 10% solids dispersion, then neutralized with sodium hydroxide to a pH of about 7, as determined by using a Beckman glass electrode pH meter. 9 kg. of a 50% emulsion of natural lecithin were diluted to 20% solids by the addition of 13.5 kg. of water, and the diluted protein dispersion and diluted lecithin emulsion were mixed with a paddle stirrer running at about 300 r.p.m. for 30 minutes and thereafter the mixture was spray-dried in a Turbulaire laboratory spray dryer. The dryer was type N, manufactured by the Western Precipitation Corporation, of Los Angeles, California. The mixture entered the dryer at a temperature of 350° F., the exit temperature was 180° F., and the feed rate through the dryer was 10 kg. per hour of diluted mix. The pneumatic atomizer nozzle of the dryer had a 1/8" feed opening and operated at 30 p.s.i. of atomizing air.

The resultant product was a free-flowing, slightly yellow, powder. The particles appear to have a somewhat irregularly spherical shape, i.e., a hollow core, that shows up as a "doughnut" in cross section. The incorporated lipid material appears to be quite evenly dispersed throughout the particle, and in certain cases there is a slight concentration along the outside of the particle. The particles are about 50 microns in diameter.

Photomicrograph preparation included fixing microtomed sections with osmic acid, which were then stained with Cotton Blue-Sudan IV combination. The test material was first fixed in osmium tetroxide vapors and embedded in mixed methacrylic acid esters. The fixing was done in a covered staining dish by placing 0.05 gram of osmium tetroxide crystals in a small vial in the dish containing vials with test samples. The vapors were allowed to react with the test samples for 24 hours. The particles were then embedded in n-butyl methacrylate for one hour and transferred to a mixture of 8.5 parts n-butyl methacrylate and 1.5 parts of methyl methacrylate containing 1% of 50% 2,4-dichlorobenzoyl peroxide in dibutyl phthalate (Luperco CDB) for an additional two hours. These procedures were carried out at room temperature. The mixed monomeric solution was then decanted and the particles transferred into No. 00 gelatin capsules. The mixed monomeric solution containing Luperco CDB was then added to the particles and the capsules were kept at 60° C. for 24 hours. The gelatin capsules were washed off from the hardened polymer with hot water. The specimen block was placed in the holder on the microtome and sections from 1 to 5 microns in thickness were made. The individual sections were fixed on a microscope slide with a gelatin adhesive and then stained as above for the combination stain. Observation of whole particles and microtomed sections revealed that the largest particles were approximately 110 microns in diameter, while the smallest were approximtely 20 microns in diameter—the majority of the particles averaging around 50 microns in diameter. The particles were found to be irregularly round or spherical, with what might be considered a hollow "core."

*Example II*

The soy protein-lipid formulation of Example I was employed in the preparation of a high protein cookie which ordinarily utilizes egg yolk as the emulsifier. The protein level in this type of cookie is 14%. The cookie had the following formula:

| | | |
|---|---|---|
| Vegetable shortening | pounds | 90 |
| Sugar, light golden | do | 170 |
| Molasses | do | 30 |
| Soy protein-lipid | do | 20 |
| Soy flour | do | 14 |
| Salt | do | 1½ |
| Ammonium bicarbonate | do | 3 |
| Vanilla powder | ounces | 8 |
| Butter flavor | do | 4 |
| Wheat flour | pounds | 280 |
| Water, approx. 6 gals. | | |

The procedure of making the cookie included first well creaming the sugar, shortening and molasses, after which the soy protein-lipid and soy flour were added. Thereafter, the ammonium bicarbonate was dissolved in part (2 gal.) of the water and added. Thereafter, the mixture was thoroughly mixed until a smooth appearance was presented, after which the balance of the ingredients were added. The dough was wire cut to develop cookies, and the cookies were baked for approximately 6 minutes at 400° F. The cookies resulting from this procedure had the same texture, palatability and appearance of those made with the equivalent amount of egg yolk, and, significantly, the high protein content was maintained.

The soy protein-lipid can be considered colloidal in nature and has a high absorption ratio and strong affinities for carbohydrates, proteins, fat and water, uniting all the components in the dough in such a way that the reactions causing rapid staling in the dough are materially retarded. We find that the soy protein-lipid prolongs the "fresh baked" characteristic desired in bakery products.

*Example III*

The soy protein-lipid of Example I was used in place of one-half of the egg yolk ordinarily employed in the manufacture of French type ice cream, and the resultant product had a texture, flavor and appearance equal to that of the French type ice cream made with egg yolk alone. French type ice cream is also characterized by a higher butterfat content than conventional ice cream.

*Example IV*

A soy protein-lipid product was prepared according to the procedure of Example I except that 36 kg. of 50% lecithin emulsion were employed prior to dilution, and in combination with the 15 kg. of soy protein curd of 30% solids. This resulted in a soy protein-lipid product wherein the lipid concentration was about 80% and the protein concentration about 20%, as contrasted to the 50–50 ratio provided in Example I. The dried product was a free-flowing powder, and microscopic examination revealed the same hollow core type of particle having the lipid portion dispersed throughout the protein matrix.

*Example V*

The procedure of Example I was followed, but instead of employing 9 kg. of the 50% emulsion of natural lecithin, slightly over 1 kg. was employed, to yield a soy protein-lipid product having about 90% protein and 10% lecithin. Again, the particles were free-flowing after spray drying, and manifested the same physical and microscopic characteristics as the particles of Example I.

*Example VI*

The procedure of Example I was employed, but instead of employing 9 kg. of the 50% lecithin emulsion, only 90 grams were employed, which resulted in a product containing about 99% protein and only about 1% of the lipid portion, i.e., lecithin. This product also manifested free flowability. The product showed improved wettability over the straight soy protein, and also the tendency of the soy protein to "dust' was controlled.

*Example VII*

The procedure of Example I was followed, but in place of starting with 15 kg. of the 30% solids soy protein curd, 4½ kg. of dried soy proteinate were employed as the starting material. This was diluted to a 10% dispersion, utilizing 40½ kg. of water. The product produced through this procedure was substantially the same as that of Example I.

*Example VIII*

The procedure of Example I was followed, but in place of the 9 kg. of the 50% lecithin emulsion, 4½ kg. of dry commercial lecithin were employed, diluted to 20% concentration through the addition of 18 kg. of water prior to mixing with the soy protein. Again, the product produced hereunder was substantially the same as that produced in Example I.

*Example IX*

The procedure of Example VIII was followed, but in place of starting with 4½ kg. of dry natural lecithin, 4½ kg. of acetone-washed, oil-free phosphatides in dried forms were employed. These were diluted to a 20% emulsion and thereafter combined with the soy protein to provide a product similar to those of Example I and VIII.

*Example X*

The procedure of Example IX was followed, but in place of the oil-free phosphatides, 4½ kg. of alcohol-soluble lecithin fraction (in dry form) were employed, and again with the production of a product similar to that of Example IX.

*Example XI*

The procedure of Example VIII was followed, but in place of the dry natural lecithin, 4½ kg. of hydroxylated natural lecithin were employed. The hydroxylation was achieved through reaction with lactic acid and hydrogen peroxide, being more fully described in U.S. Patent No. 2,629,662. The product resulting was substantially the same as that developed by the Example VIII procedure insofar as free-flowability, texture, appearance, etc. were concerned.

*Example XII*

For this example, 2 kg. of isoelectric dry soy protein (unneutralized dry filter cake having a pH of about 4.5) were suspended in 20 kg. of water at about 120° F. The suspension was then neutralized through the addition of approximately 500 ml. of 10% sodium hydroxide. 2 kg. of commercial lard were melted on a steam bath and added to the warm protein suspension, with the mixture being mixed with a paddle stirrer for 30 minutes at about 120° F. Microscopic examination of the product after drying showed that some of the lard was dispersed within the particles as separate free globules. Some lard, however, was carried on the surface of the particles. The particles, however, did manifest the desirable free-flowing characteristic of the products produced according to the preceding examples.

*Example XIII*

The procedure of Example VII was followed, substituting for the dried curd a similar amount of dry "soy protein-solubles," i.e., both protein and whey. The dispersion of the protein-whey was maintained at 120° F. during mixing, and the soy protein-solubles-lipid product resulting therefrom exhibited physical characteristics similar to the product produced under the procedure of Example VII.

*Example XIV*

For this example, 15 kg. of protein (30% solids) were utilized as the protein source material, and for the lipid, 4.5 kg. of propylene glycol monostearate were utilized. The monostearate was melted on a steam bath, the melting point being about 100° F. The mixture during paddle stirring was maintained at about 160° F. to maintain fluidity. The product was light colored, free flowing and easily dispersed in water.

*Example XV*

The procedure of Example XIV was followed, using the Example VI lipid proportion of propylene glycol monostearate, and a particle similar to that in Example VI was produced.

*Example XVI*

The procedure of Example XV was followed, but in place of the propylene glycol monostearate, commercial grade glyceryl lactostearate was employed, and again particles similar to those produced under the Example VI procedure were produced—these particles improving the wettability and controlling the dustiness of the soy protein portions.

*Example XVII*

The procedure of Example I was followed, but in place of the 9 kg. of 50% natural lecithin emulsion, 1.5 kg. of the natural lecithin 50% emulsion were used, supplemented by 4¼ kg. of degummed soy oil. The latter corresponds to the oil product resulting from distillation in the central right-hand portion of the FIG. 1 diagram. The Example I procedure was augmented by a homogenization step following stirring, using a Manton-Gaulin Model 25 two-stage laboratory homogenizer—this being manufactured by the Manton-Gaulin Manufacturing Company, of Everett, Massachusetts, and employing a 4500 p.s.i. pressure. The homogenizer developed a shearing action through an orifice under pressure. Drying of this homogenized mixture was achieved using 390° F. temperature at the inlet and 185° F. at the outlet, with 35 p.s.i. atomizing pressure in the spray nozzle.

The product was again characterized by free flowability.

*Example XVIIII*

The procedure of Example XVII was followed, but in place of the combination of soy oil and lecithin, 18 kg. of degummed soy oil were employed. A free-flowing, granular product was produced.

*Example XIX*

This example defines the large scale manufacturing procedure for soy protein-lipid, and for this 1200 lbs. of soy protein curd cake at 34% solids were mixed with 1200 lbs. of water in a tank of 4 ft. diameter while using turbine agitation at 155 r.p.m. After a half hour, the 17% suspension was neutralized with liquid sodium hydroxide to a pH of 7 to give a neutral proteinate solution. 800 lbs. of natural lecithin emulsion at 50% solids were dispersed and diluted to 17% solids by the addition of 1600 lbs. of water in a separate vessel, and the diluted emulsion was added to the neutralized proteinate solution to give 4800 lbs. of dispersion containing approximately 400 lbs. of proteinate and 400 lbs. of lecithin on a dry basis. This dispersion was stirred at 155 r.p.m. for 2 hours, after which it was fed to a Blaw-Knox horizontal spray dryer at a rate to give 500 lbs. of dry solids per hour pumped by a Manton-Gaulin Triplex Pump at an atomizer pressure of 3,000 p.s.i. through nozzles of 0.035" orifice; the inlet temperature being 400° F. and the outlet temperature 170° F. The product produced thereby was substantially the same as that produced by the procedure of Example I.

From the foregoing, it will be seen that a variety of soy protein-lipid complexes can be provided using lipid sources from the group consisting of triglycerides, modified glycerides, monoglycerides such as the above-mentioned glyceryl monostearate, diglycerides, phosphatides, phospholipids, and mixtures thereof.

While in the foregoing specification a detailed description of representative embodiments has been set down for the purpose of acquainting the skilled artworker with the practice of the invention, many variations in the details herein given may be made by those skilled in the art without departing from the spirit and scope of the invention.

We claim:

1. A new composition of matter, consisting essentially of a substantially fiber-free soy protein and soy lecithin, said composition when dispersed in water having a pH of about 7, said protein and lecithin being intimately mixed to provide free-flowing powder particles, said protein constituting from about 20% to about 80% of the weight of said composition, said particles being hollow, with the protein and lecithin being dispersed in the structure of each particle.

2. A method for producing a free flowing lecithin emulsifier, comprising providing an emulsion consisting essentially of water, soy lecithin, and a substantially fiber-free soy protein having a pH of about 7, the protein being in an amount of about one-fourth to 4 times by weight of the lecithin in said emulsion, and spray drying the resultant mixture to provide a new composition consisting essentially of hollow particles, with the protein and lecithin being dispersed in the structure of each particle.

References Cited by the Examiner

UNITED STATES PATENTS

| | | | |
|---|---|---|---|
| 2,740,720 | 4/1956 | Horvath | 99—134 |
| 2,881,076 | 4/1959 | Sair | 99—14 |
| 2,928,821 | 3/1960 | Chayen | 260—112 |

FOREIGN PATENTS 618,462  4/1961  Canada.

A. LOUIS MONACELL, *Primary Examiner.*

JAMES J. MULLEN, DANIEL D. DONOVAN,
*Assistant Examiners.*